United States Patent
Potanin et al.

(10) Patent No.: US 7,498,769 B1
(45) Date of Patent: Mar. 3, 2009

(54) APPARATUS AND METHOD FOR DUAL MODE BATTERY CHARGER WITH LINEAR AND SWITCHED CONTROL MODES BASED ON OPERATING CONDITIONS

(75) Inventors: Vladislav Potanin, San Jose, CA (US); Elena Potanina, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/073,135

(22) Filed: Mar. 4, 2005

(51) Int. Cl.
*H02J 7/00* (2006.01)
*H02J 7/04* (2006.01)

(52) U.S. Cl. .................. 320/125; 320/128; 320/137; 320/141; 320/134

(58) Field of Classification Search .................. 320/141, 320/143, 148; 324/433
See application file for complete search history.

(56) References Cited

U.S. PATENT DOCUMENTS

| | | | | |
|---|---|---|---|---|
| 5,204,611 A | * | 4/1993 | Nor et al. | 320/145 |
| 5,734,205 A | * | 3/1998 | Okamura et al. | 307/110 |
| 5,808,444 A | * | 9/1998 | Saeki et al. | 320/117 |
| 5,889,387 A | * | 3/1999 | Massie | 320/145 |
| 5,903,137 A | * | 5/1999 | Freiman et al. | 320/163 |
| 5,909,137 A | * | 6/1999 | Kimura | 327/359 |
| 5,982,148 A | * | 11/1999 | Mercer | 320/134 |
| 5,982,151 A | * | 11/1999 | Nagai et al. | 320/141 |
| 6,018,229 A | * | 1/2000 | Mitchell et al. | 320/112 |
| 6,329,796 B1 | * | 12/2001 | Popescu | 320/134 |
| 6,861,824 B1 | * | 3/2005 | Liu et al. | 320/164 |
| 2004/0012375 A1 | * | 1/2004 | Bucur | 320/141 |
| 2004/0075418 A1 | * | 4/2004 | Densham et al. | 320/111 |
| 2004/0108838 A1 | * | 6/2004 | Chen | 320/137 |
| 2004/0245962 A1 | * | 12/2004 | Xi et al. | 320/134 |
| 2005/0275381 A1 | * | 12/2005 | Guang et al. | 320/141 |
| 2006/0028188 A1 | * | 2/2006 | Hartular et al. | 323/273 |
| 2006/0087303 A1 | * | 4/2006 | Hartular et al. | 323/283 |

OTHER PUBLICATIONS

National Semiconductor, "LM3622 Lithium-Ion Battery Charger Controller", Feb. 2000, pp. 1-9.
National Semiconductor, "LP3945/LP3946 Battery Charge Management System", Oct. 2003, pp. 1-15.
Linear Technology, "LTC4008 4A, High Efficiency, Multi-Chemistry Battery Charger", Jan. 2003, pp. 1-20.

* cited by examiner

*Primary Examiner*—Edward Tso
*Assistant Examiner*—Alexis Boateng
(74) *Attorney, Agent, or Firm*—Darby & Darby P.C.; Matthew M. Gaffney

(57) ABSTRACT

A circuit for battery charging is provided. The circuit provides a charge current to a battery, and regulates the charge current with either linear regulation or switching regulation, based on operating conditions. In one embodiment, if the input voltage minus the battery voltage is less than a threshold (e.g. 100 mV), linear regulation is employed, and if the input voltage minus the battery voltage is greater than the threshold (e.g. 100 mV), switching regulation is employed. The threshold may be fixed, or the threshold may be adjustable based on die temperature or charge current.

26 Claims, 17 Drawing Sheets

APPARATUS AND METHOD FOR DUAL MODE BATTERY CHARGER WITH LINEAR AND SWITCHED CONTROL MODES BASED ON OPERATING CONDITIONS

FIELD OF THE INVENTION

The invention is related to battery chargers, and in particular, to an apparatus and method for a dual mode battery charger with linear and switched control modes based on operating conditions.

BACKGROUND OF THE INVENTION

Generally, batteries are used to supply power to portable devices such as personal computer, radios, radiophones, stereo cassette tape players etc. Such batteries are typically available in two different type such as those characterized as rechargeable or non-rechargeable and exhibit different end-of-life voltage characteristics and effective series resistances. Non-rechargeable battery types are those ordinary alkaline batteries that should not be subjected to recharging attempts. Rechargeable battery types include nickel-cadmium (Ni—Cd), nickel-hydrogen (Ni—H), lithium-ion (Li—Ion), and nickel metal-hydride (Ni—MH). Also, a Constant Current-Constant Voltage (CC-CV) charging algorithm is common for most modern rechargeable batteries.

BRIEF DESCRIPTION OF THE DRAWINGS

Non-limiting and non-exhaustive embodiments of the present invention are described with reference to the following drawings, in which.

DETAILED DESCRIPTION

Figure 1:
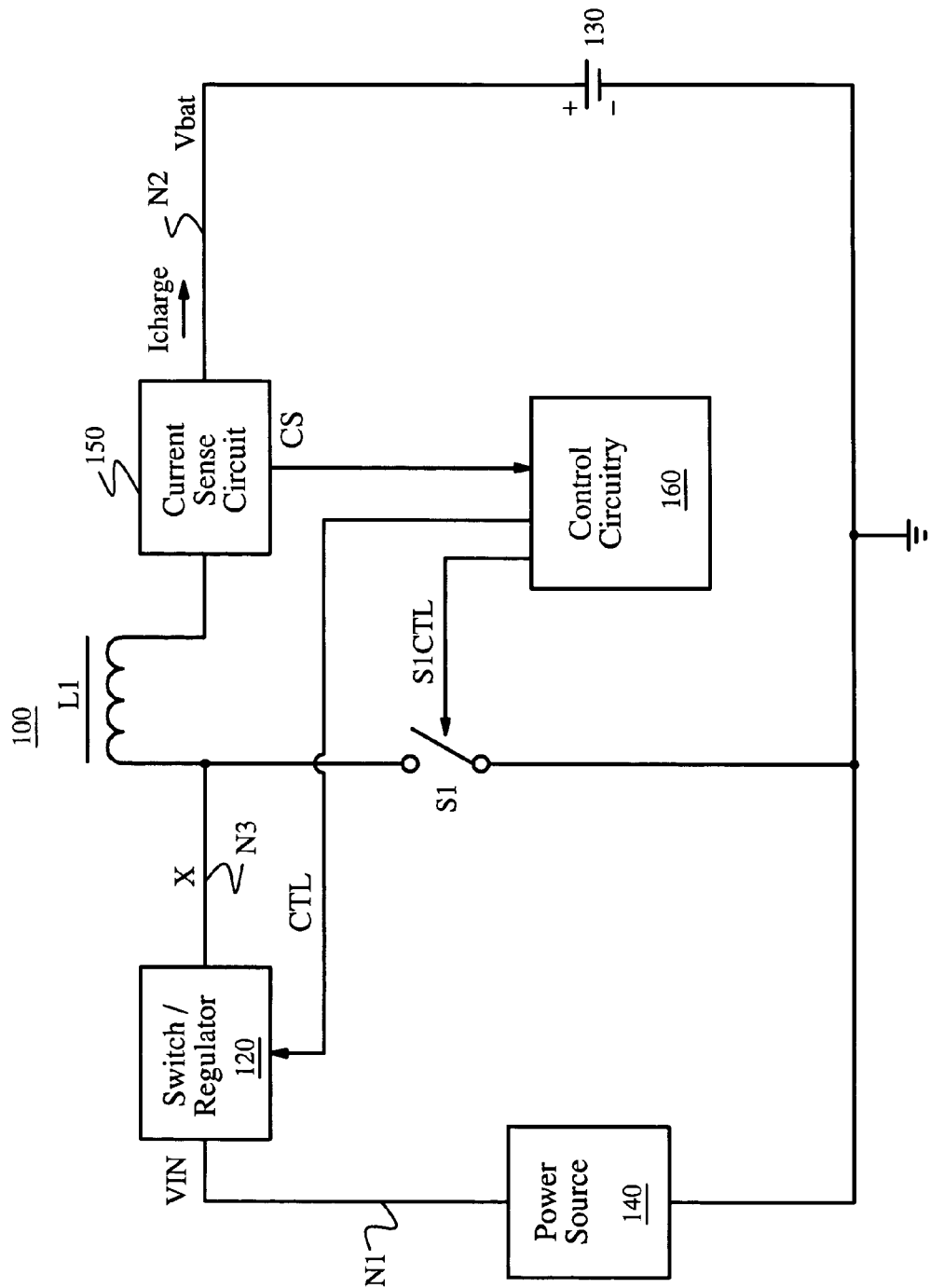
FIG. 1 illustrates a block diagram of a circuit for battery charging.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set froth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on". The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a circuit for battery charging. The circuit provides a charge current to a battery, and regulates the charge current with either linear regulation or switching regulation, based on operating conditions. In one embodiment, if the input voltage minus the battery voltage is less than a threshold (e.g. 100 mV), linear regulation is employed, and if the input voltage minus the battery voltage is greater than the threshold (e.g. 100 mV), switching regulation is employed. The threshold may be fixed, or the threshold may be adjustable based on die temperature or charge current.

FIG. 1 illustrates a block diagram of an embodiment of circuit 100. Circuit 100 includes switch/regulator 120, battery 130, power source 140, current sense circuit 150, control circuitry 160, inductor L1, and switch circuit S1. Circuit 100 is arranged to regulate charge current Icharge for charging battery 130. In one embodiment, a portion of circuit 100 is included on an integrated circuit. In one embodiment, control circuitry 160 is included on an integrated circuit, and the other elements shown in FIG. 1 are external to the integrated circuit. In other embodiments, additional components, such as switch regulation 120, switch circuit S1, and current sense circuit 150, may be included on the integrated circuit.

In operation, power source 140 provides input voltage VIN at input node N1. Power source 140 may include a wall adapter, a power bus for a USB interface, a power bus for a firewire interface, or the like. Also, battery 130 is arranged to provide voltage Vbat at output node N3.

Current sense circuit 150 is arranged to sense current Icharge, and to provide current sense signal CS based on the sense current. Further, current sense circuit 150 may includes a sense resistor, a sense transistor, or the like. Control circuitry 160 is arranged to provide control signals CTL and S1CTL based, in part, on current sense signal CS.

More specifically, control circuitry 160 is arranged to provide signal CTL such that either linear regulation or switching regulation is performed. Whether linear regulation or switching regulation is performed is based on monitored operating condition(s). Either linear or switching regulation is selected based on whether linear regulation or switching regulation would result in less power dissipation, as roughly determined based on the monitored operating condition(s). The monitored operating condition(s) may include input voltage VIN, charge current Icharge, and/or a die temperature of the integrated circuit. For example, if the input voltage is relatively high, it may be preferable to employ switching regulation for reduced power dissipation.

During linear regulation, control circuitry 160 provides signal CTL based on negative feedback such that switch/regulator 120 operates as a pass transistor. Also, during linear regulation, control circuitry 160 provides signal S1CTL at an unasserted level so that switch circuit S1 remains open during linear regulation.

During switching regulation, control circuitry 160 provides signal CTL such that switch/regulator 120 operates as a switch. Also during switching regulation, control circuitry 160 provides signals CTL and S1CTL such that switch/regulator 120 and switch S1 operate as switches to provide buck switching regulation. Further, during switching regulation, switch/regulator 120 is closed when switch circuit S1 is open, and vice versa. When switch/regulator 120 is closed, signal X at node N3 corresponds to approximately VIN, so that a voltage of approximately Vbat-VIN is applied across inductor L1. When switch/regulator 120 is open, signal X corresponds to ground, so that a voltage of Vbat-GND is applied across inductor L1.

Although one embodiment of circuit 100 is illustrated in FIG. 1, other arrangements of circuit 100 are within the scope and spirit of the invention. For example, although one switching mode is described above with regard to FIG. 1, in other embodiments, additional switching modes may be employed, based on the monitored operating condition(s), and circuit 100 may include additional switch circuits than shown in FIG. 1 for performing each of the switching modes.

As another example, although an inductive-based regulation for the switching regulation is illustrated in FIG. 1, in other embodiment, a switched-capacitor based regulation for the switching regulation may be employed. Also, although an embodiment arranged to employed synchronously-rectified regulation during the switching regulation is illustrated in FIG. 1, in other embodiments, the circuit may be arranged for asynchronously-rectified regulation for the switching regulation. Also, components may be arranged in different location than illustrated in FIG. 1. For example, although current sense circuit 150 is shown in a particular location in FIG. 1, in other embodiments, current sense circuit 150 may be in a different location.

Figure 2:
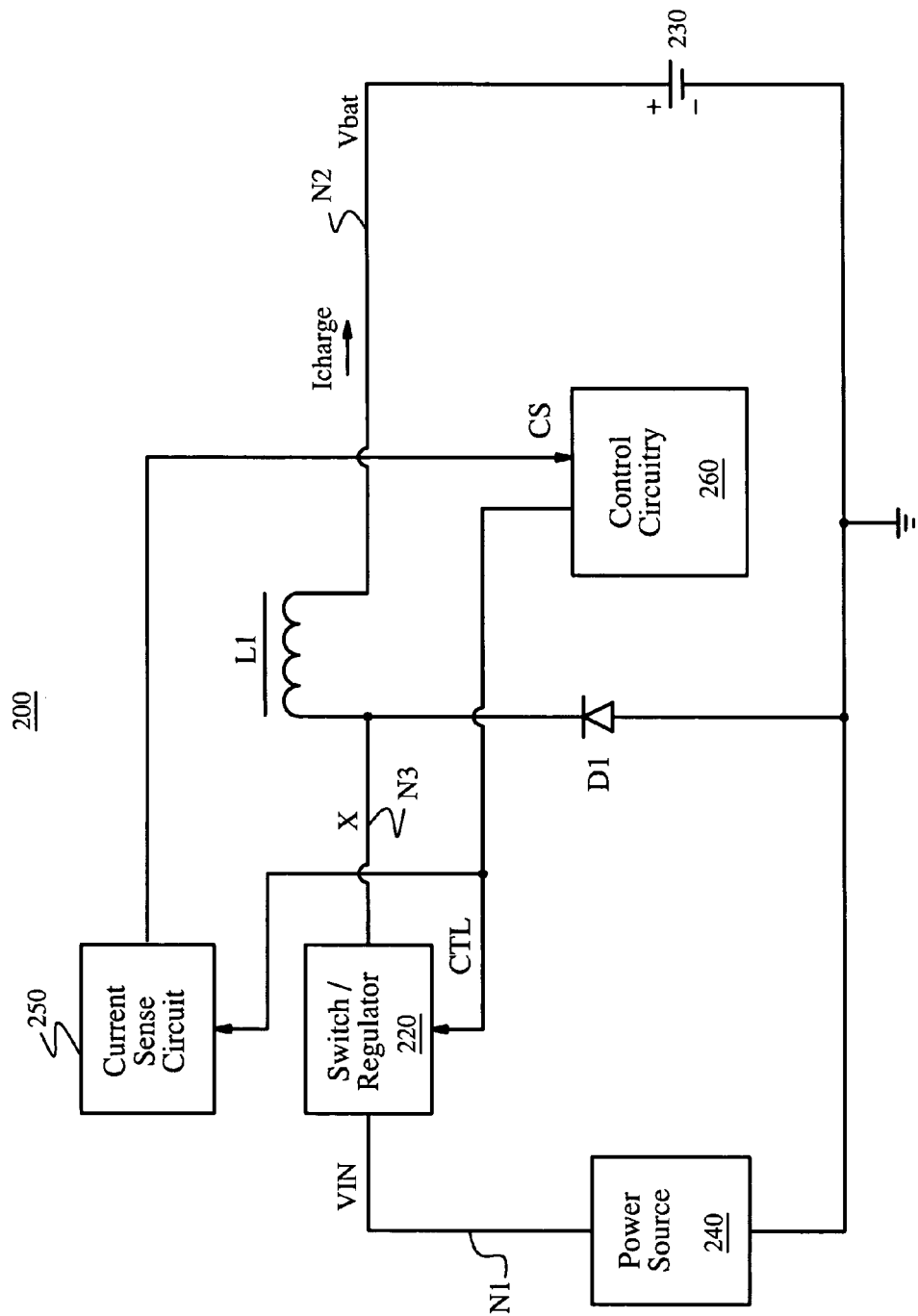
FIG. 2 shows a block diagram of an embodiment of the circuit of FIG. 1 in which asynchronously-rectified switching regulation is employed.

FIG. 2 shows a block diagram of an embodiment of circuit 200. Circuit 200 and components in circuit 200 may operate in a substantially similar manner as circuit 100 of FIG. 1, and may operate in a different manner in some ways. Circuit 200 includes diode D1 instead of switch circuit S2 for asynchronously-rectified regulation for the switching regulation. Also, circuit 200 illustrates current sense circuit 250 in a different location than illustrated for current sense circuit 150 of FIG. 1. For example, in one embodiment, current sense circuit 250 is a sense transistor having a gate that is coupled to a gate of the power transistor in switch/regulator 220.

Figure 3:
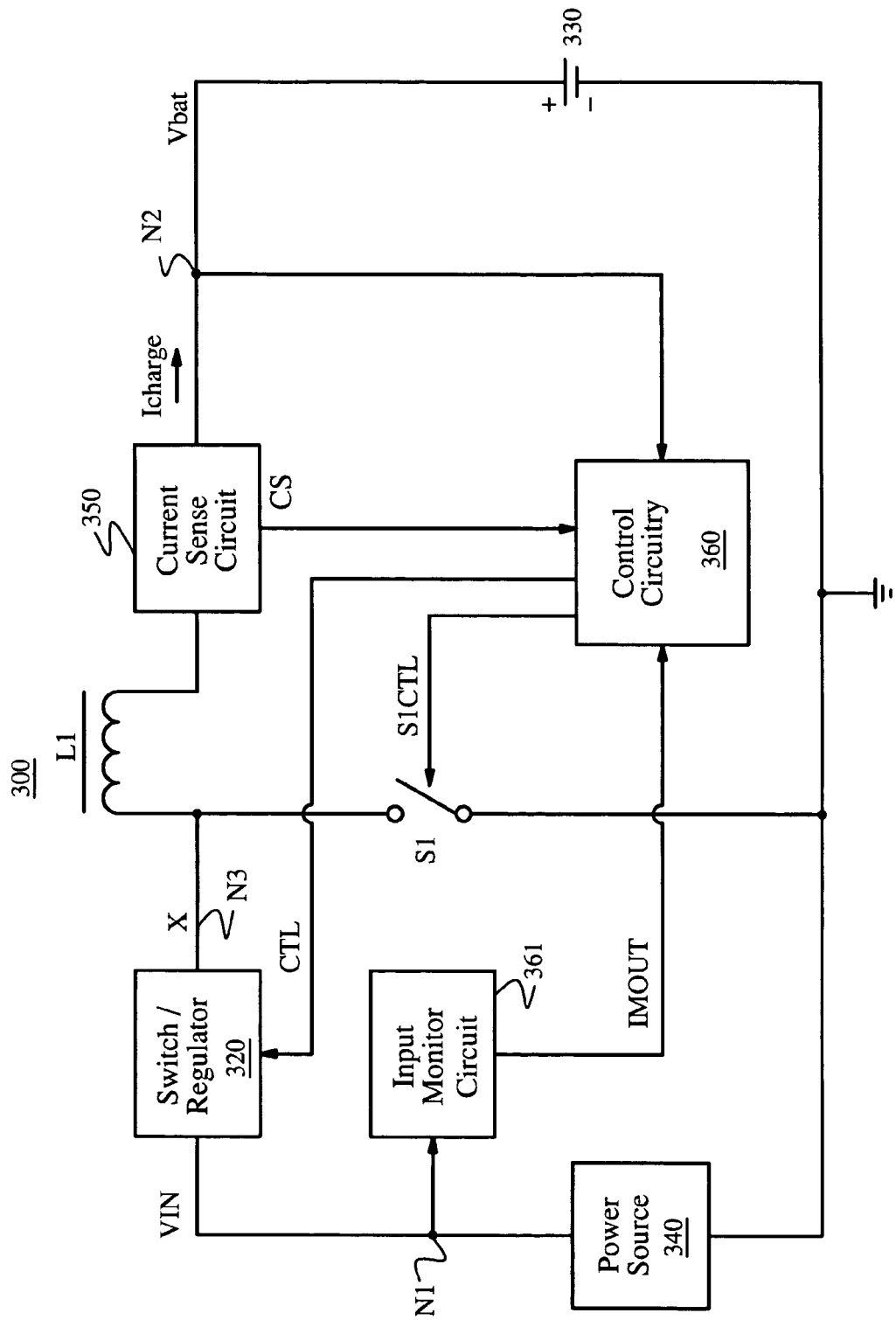
FIG. 3 illustrates a block diagram of an embodiment of the circuit of FIG. 1 that includes an input monitor circuit.

FIG. 3 illustrates a block diagram of an embodiment of circuit 300. Circuit 300 is an embodiment of circuit 100 of FIG. 1. Circuit 300 further includes input monitor circuit 361.

In operation, input circuit 361 monitors input voltage VIN, and provides input monitor output signal IMOUT based on signal VIN. Further, control circuitry 360 is arranged to control the regulation of charge current Icharge based, at least in part, on signal IMOUT.

Figure 4:
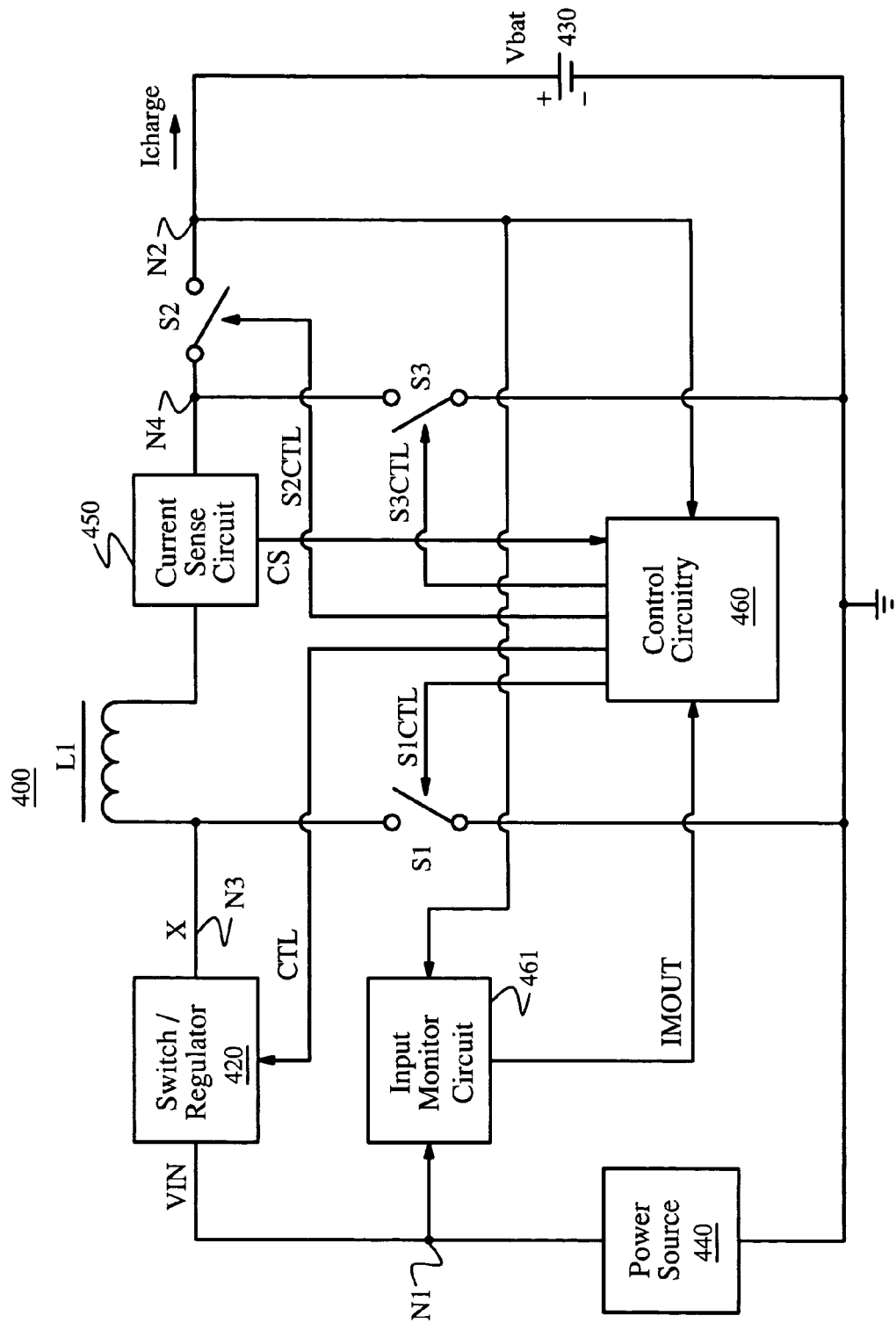
FIG. 4 shows a block diagram of an embodiment of the circuit of FIG. 3 that includes switches for modified buck pulse switching regulation.

FIG. 4 shows a block diagram of an embodiment of circuit 400. Circuit 400 is an embodiment of circuit 300 of FIG. 3. Circuit 400 further includes switch circuit S2 and switch circuit S3.

In operation, input monitor circuit 461 receives both input voltage VIN and battery voltage Vbat, and provide signal IMOUT based on input voltage VIN and battery voltage Vbat. In one embodiment, input monitor circuit 461 is configured to assert signal IMOUT if VIN-Vbat exceeds a first threshold, and is further configured to unassert signal IMOUT if VIN-Vbat is less than the first threshold. In one embodiment, the first threshold is a value from about 100 mV to 200 mV. In one embodiment, the first threshold is a fixed value. In other embodiments, the first threshold may vary based on monitored operating condition(s), such as die temperature. The value of the first threshold may be selected to approximately minimize power dissipation.

Further, circuit 400 is arranged to operate in three different modes: linear regulation mode, switched buck pulse mode, and modified switched buck pulse mode. In one embodiment, the determination of which mode to operate in is determined as follows:

if [VIN-Vbat]<thresh1, then linear regulation,
if [VIN-Vbat]>thresh2, then switched buck pulse mode, and
if thresh2>[VIN-Vbat]>thresh1, then modified switched buck pulse mode, where thresh1 represents the first threshold, and where thresh2 represents a second threshold (e.g. 1V) that is grater than the first threshold.

During the linear regulation mode and the switched buck pulse mode, control circuitry 460 asserts signal control signal S2CTL and unasserts control signal S3CTL so that switch circuit S2 is closed and switch circuit S3 is open.

During modified switched buck pulse mode, switch circuit S2 is open when switch circuit S1 is open, and closed when switch circuit S2 is closed. Also, switch circuit S3 is closed when switch/regulator 420 is closed, and open when switch regulator 420 is open. Accordingly, for each clock cycle, there is a first phase in which switch/regulator 420 and switch circuit S3 are closed, and in which switch circuits S1 and S2 are open. In the second phase of the clock cycle, switch/regulator 420 and switch circuit S3 are open, and switch circuits S1 and S2 are closed. Accordingly, when switch/regulator 420 is closed, a voltage of GND-VIN is applied across the inductor, and when switch/regulator 420 is open, a voltage of Vbat-GND is applied across the inductor.

Switch circuits S2 and S3 are optional elements in circuit 400. Without switch circuits S2 and S3, the two modes, linear regulation mode and switched buck pulse mode, based on threshold thresh1, may be employed within the scope and spirit of the invention. However, the inclusion of switch circuits S2 and S3, to employ three modes of operation, is preferred. If buck pulsed switching regulation is employed without switch circuits S2 and S3, and VIN-Vbat is fairly small (e.g. 300 mV), the duty cycle of signal CTL is relatively small, which may corrupt normal operation. In one embodiment, two modes may be employed, and threshold thresh1 may be set higher (e.g. 1V) so that the low duty cycle problem is avoided. However, in this embodiment, power dissipation may be higher than the three-mode embodiment in which a smaller threshold is used for threshold thresh1.

Figure 5:
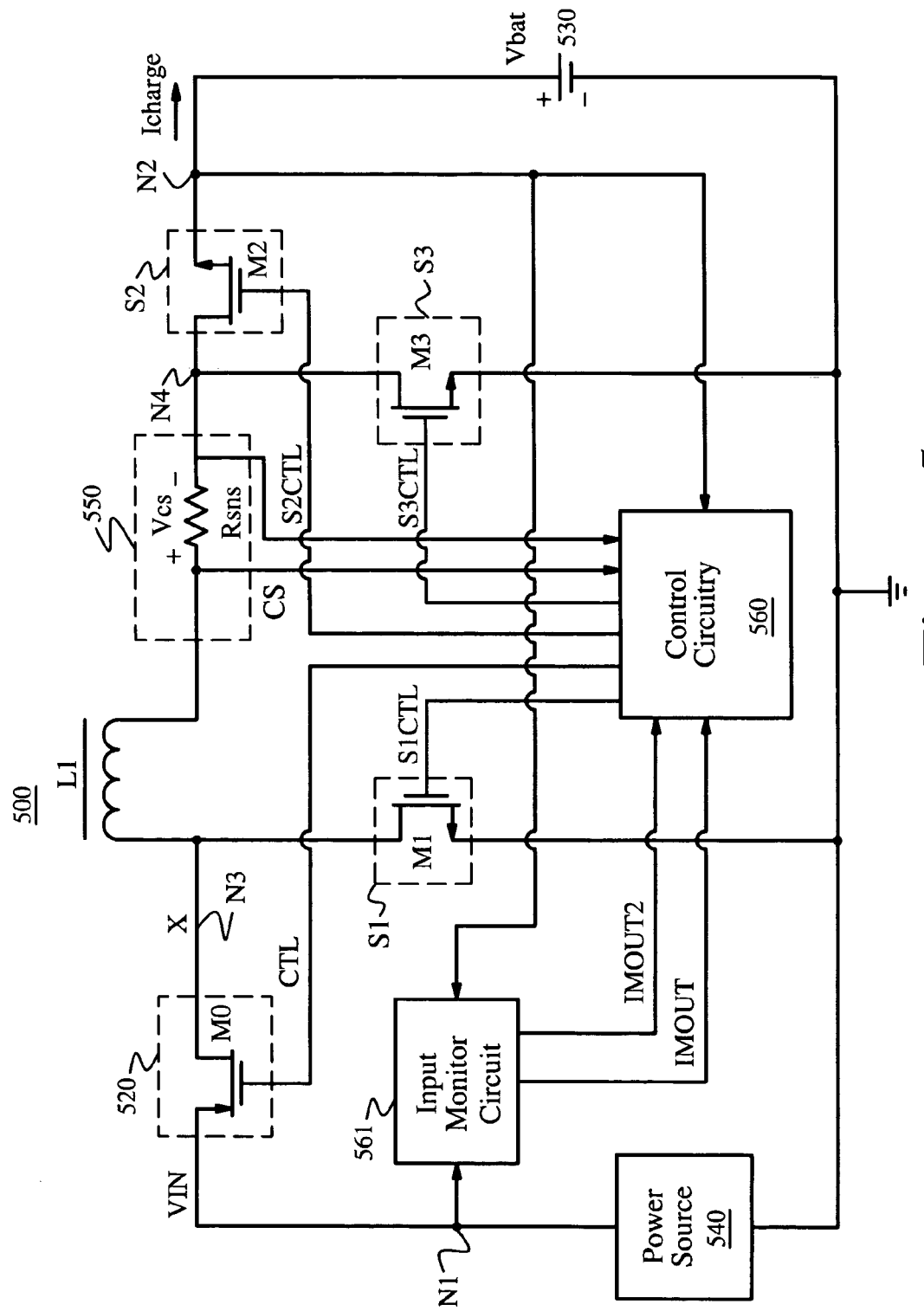
FIG. 5 illustrates a block diagram of an embodiment of the circuit of FIG. 4 in which embodiments of some components are shown in greater detail.

FIG. 5 illustrates a block diagram of an embodiment of circuit 500. Circuit 500 is an embodiment of circuit 400. In circuit 500, switch regulator 520 includes power transistor M0, switch circuit S1 includes transistor M1, switch circuit S2 includes transistor M2, switch circuit S3 includes transistor M3, and sense circuit 550 includes sense resistor Rsns. Also, input monitor circuit 561 is further configured to provide signal IMOUT2.

Figure 6:
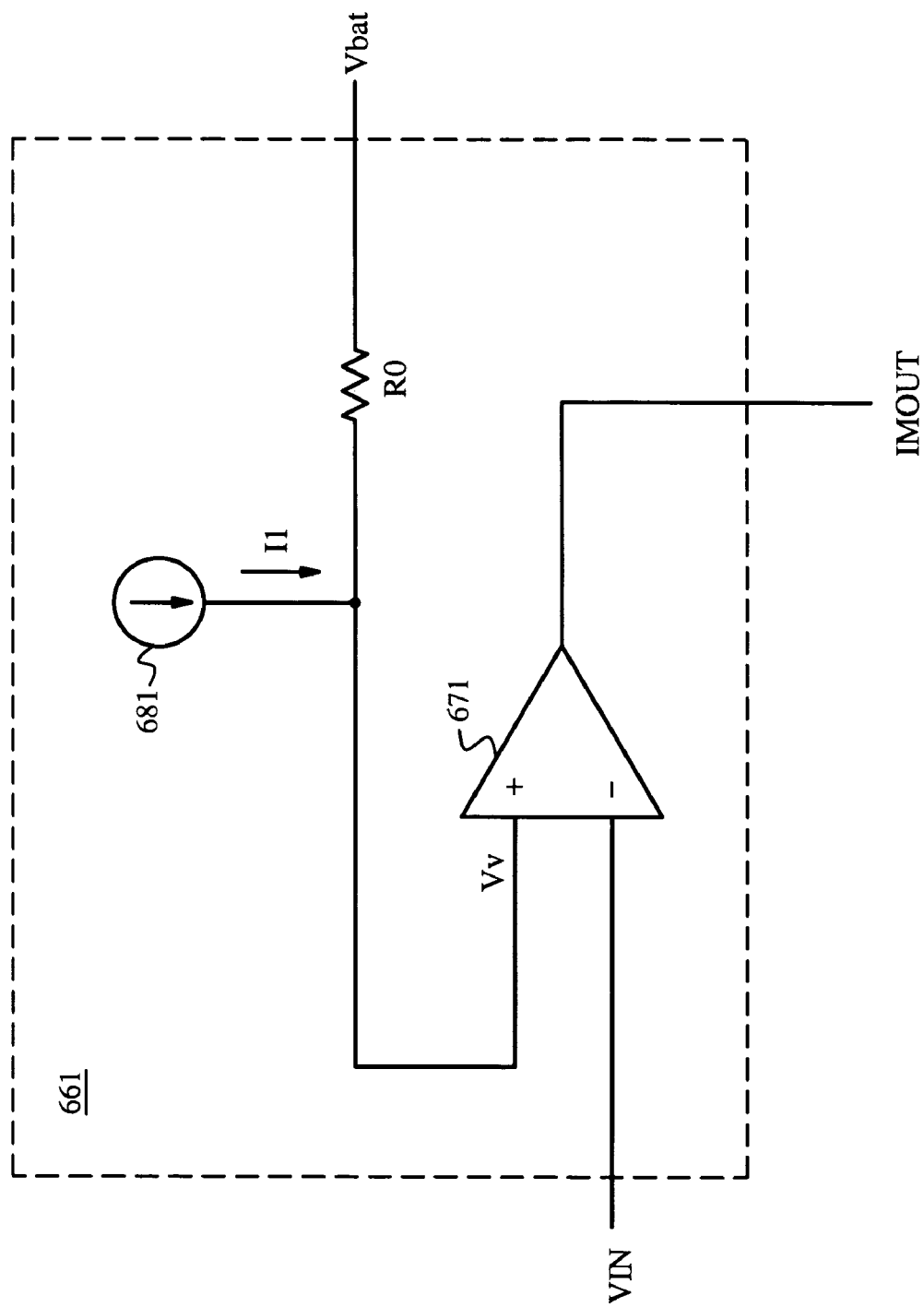
FIG. 6 shows a block diagram of an embodiment of the input monitor circuit of FIGS. 1-4.

FIG. 6 shows a block diagram of an embodiment of input monitor circuit 661. An embodiment of input monitor circuit 661 may be employed as an embodiment of input monitor circuit 361, 461, or 561 of FIGS. 3, 4, and 5, respectively. Input monitor circuit 661 includes comparator 671, current source I1, and resistor R0.

In operation, current source 681 provides current I1. In one embodiment, current source 681 is configured to provide current I1 such that current I1 is a fixed current. In other embodiment, current source 681 is configured such that current I1 is adjustable based one or more monitored operating conditions, such as die temperature.

Further, resistor R0 is arranged to provide voltage Vv such that voltage Vv is substantially given by Vbat+(R0*I1). Comparator 671 is arranged to provide signal IMOUT, and is arranged to trip if voltage Vv reaches voltage VIN.

Figure 7:
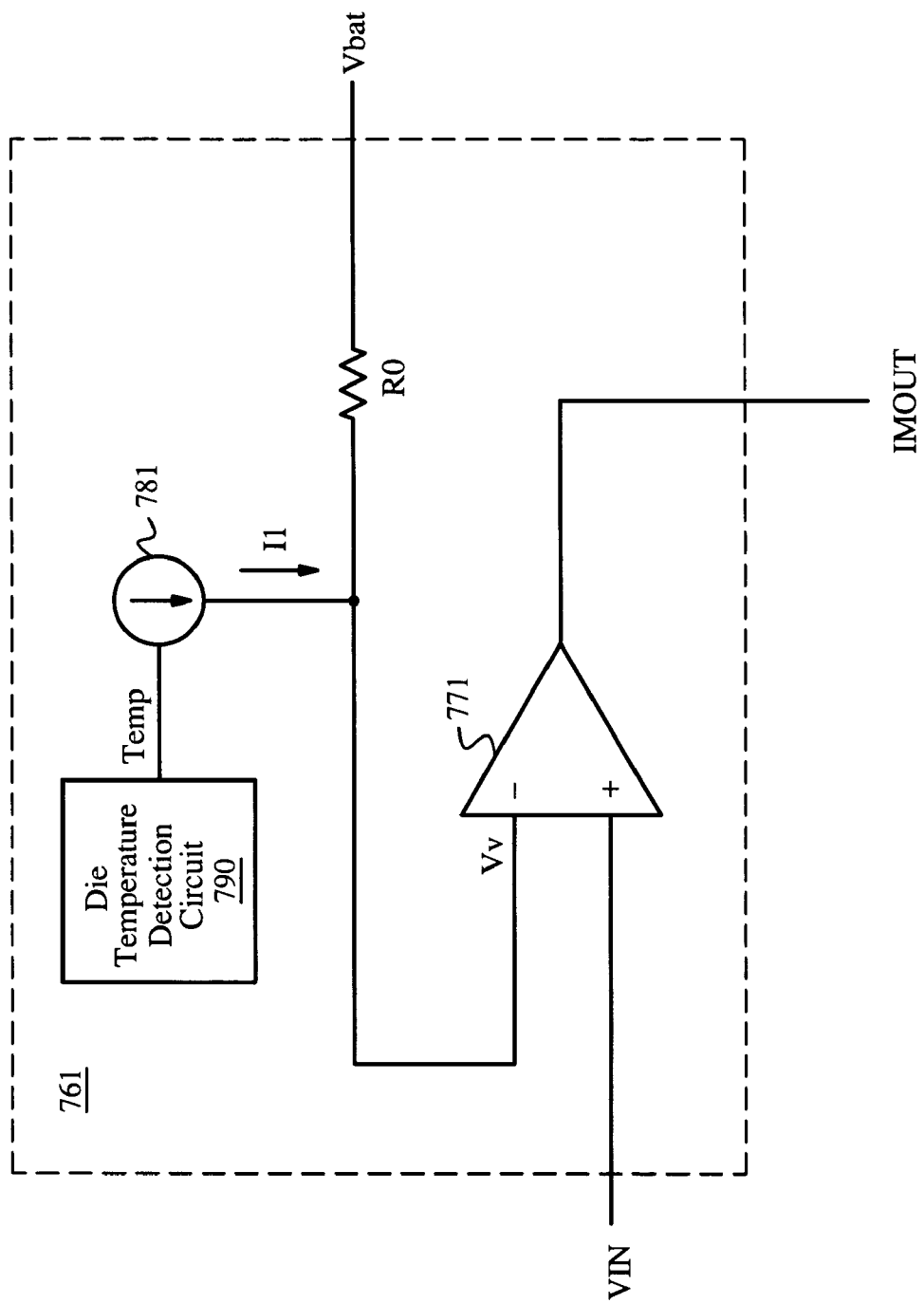
FIG. 7 illustrates a block diagram of an embodiment of the input monitor circuit of FIG. 6 which further includes a die temperature detection circuit.

FIG. 7 shows a block diagram of an embodiment of input monitor circuit 761. An embodiment of input monitor circuit 761 may be employed as an embodiment of input monitor circuit 661 of FIG. 6. Input monitor circuit 761 further includes die temperature detection circuit 790.

In operation, die temperature detection circuit 790 detects the die temperature, and provides temperature signal Temp such that signal Temp is approximately proportional to the die temperature. Also, current source 784 is arranged to provide current I1 based on signal Temp. In one embodiment, current source 784 is arranged to provide current I1 such that current I1 is approximately proportional to signal Temp. In this embodiment, the constant of proportionality is negative so that voltage Vv decreases as the die temperature increases.

Figure 8:
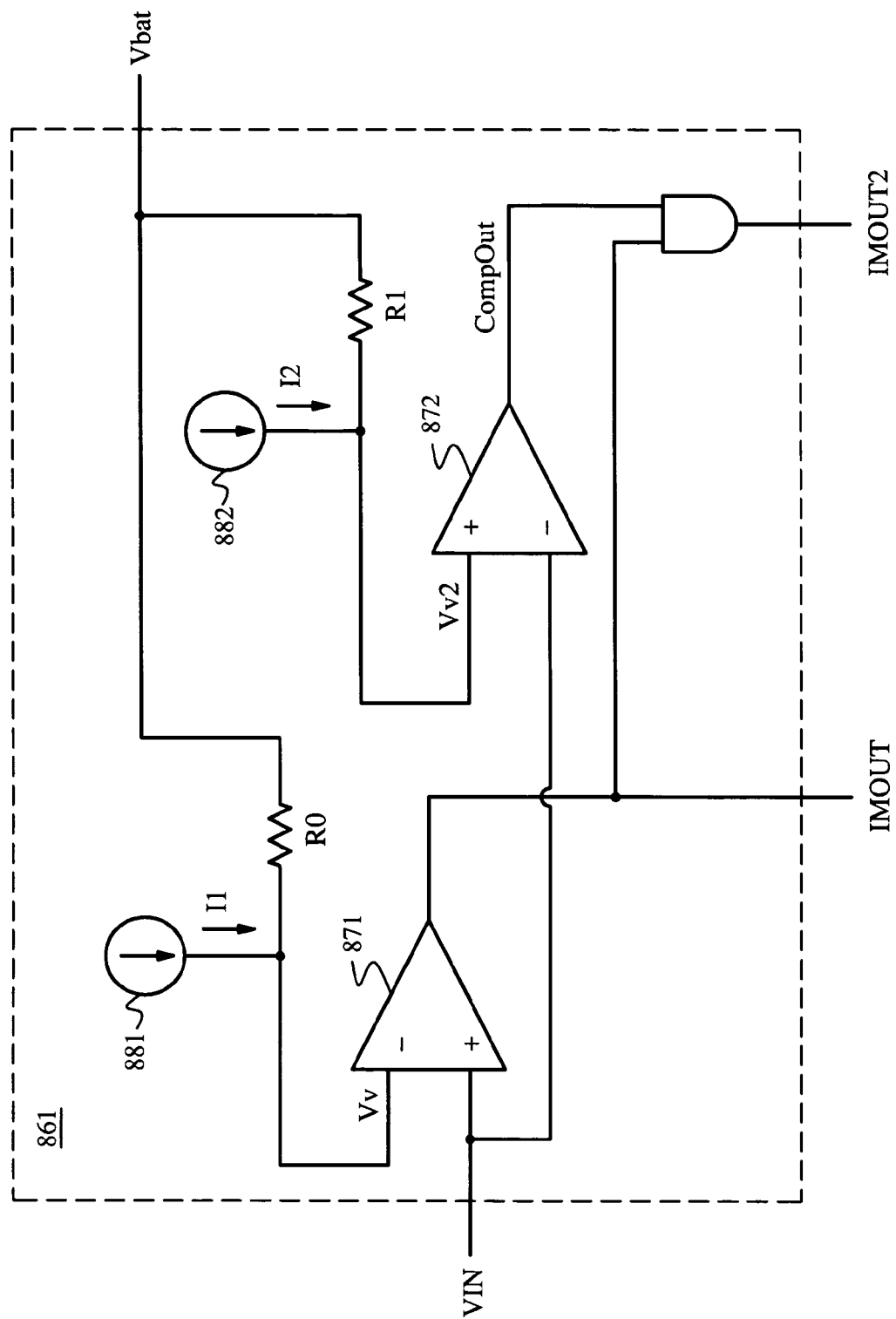
FIG. 8 shows a block diagram of an embodiment of the input monitor circuit of FIG. 5.

FIG. 8 shows a block diagram of an embodiment of input monitor circuit 861, which may be employed as an embodiment of input monitor circuit 661 of FIG. 6. Input monitor circuit 861 further includes comparator 872, resistor R1, and current source 882.

In operation, current source 882 provides current I2. Resistor R1 is arranged to provide voltage Vv2 such that voltage Vv2 is substantially given by Vbat+(R1*I2). Comparator 872 is arranged to provide signal CompOut, and is arranged to trip if voltage Vv2 reaches voltage VIN. Also, AND gate IMOUT2 is arranged to provide signal IMOUT2 such that signal IMOUT2 is asserted if signal IMOUT and CompOut are both asserted.

Although two comparators are shown in FIG. 8, in another embodiment, the functionality of comparators 871 and 872 may be combined into one comparator. For example, if the comparator trips based on threshold thresh1, the threshold may be changed to thresh 2, and the circuit may include memory, such as a flip-flop, for remembering the previous state.

Figure 9:
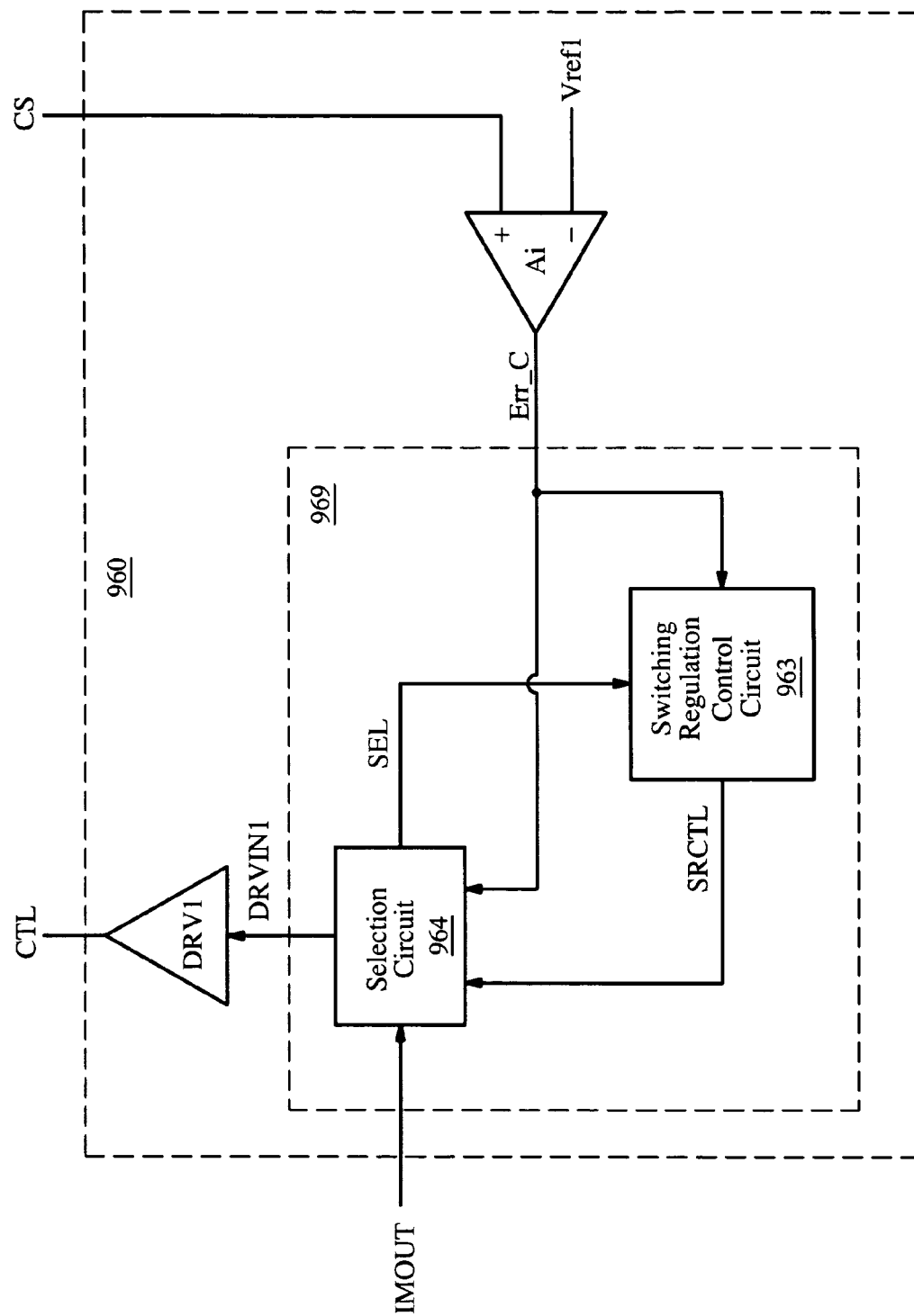
FIG. 9 illustrates a block diagram of an embodiment of the control circuitry of FIGS. 1-5.

FIG. 9 illustrates an embodiment of control circuitry 960, which may be employed as an embodiment of control circuitry 160 of FIG. 1. Control circuitry 960 includes driver DRV1, current sense error amplifier Ai, and control circuit 969. Control circuit 969 includes selection circuit 964 and switching regulation control circuit 963.

In operation, error amplifier Ai provides current error signal Err_C based on signal CS and Vref1. Switching regulation control circuit 963 is arranged to provide switching regulation control circuit SRCTL such that a parameter of signal SRCTL is modulated based on signal Err_C. Also, switching regulation circuit 963 is arranged to be disabled if signal SEL is unasserted.

Selection circuit 964 is arranged to provide signal SEL such that signal SEL is based, at least in part, on signal IMOUT. In one embodiment, signal SEL is signal IMOUT. In another embodiment, signal SEL is provided based in part on signal IMOUT and based in part on other factors. Also, selection circuit 964 is arranged to select between signal Err_C and signal SRCTL to provide control signal DRVIN1. Driver DRV is arranged to provide control signal CTL from control signal DRVIN1.

FIG. 9 illustrates an embodiment of control circuitry 960 in which current regulation is employed. This embodiment may be employed for Ni—Cd batteries, and the like. In other embodiments, current feedback and voltage feedback may be employed. For Li—Ion batteries, it is preferable to use both current and voltage feedback as part of a CC-CV algorithm to avoid damage to the battery.

Figure 10:
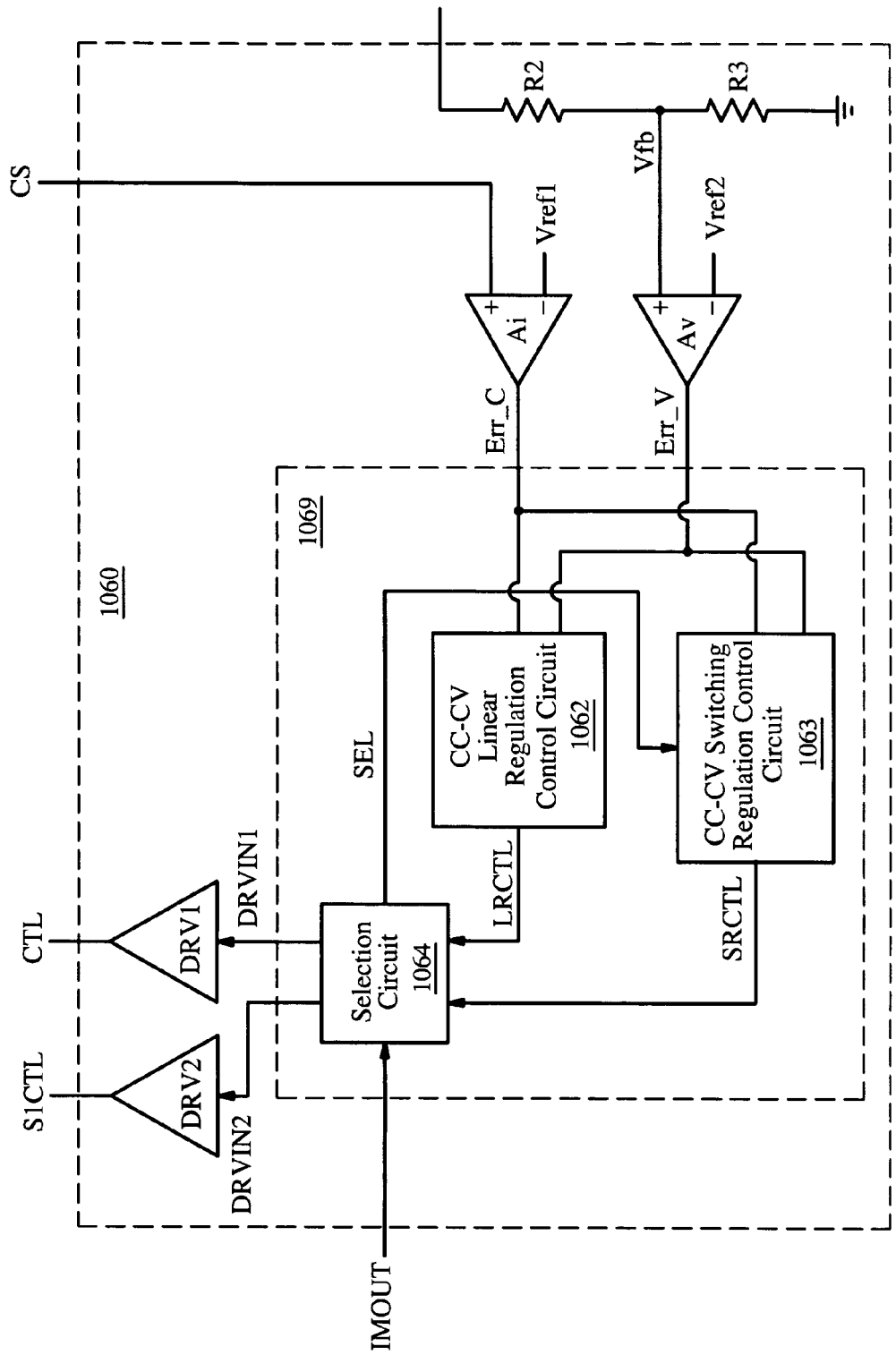
FIG. 10 shows a block diagram of an embodiment of the control circuitry of FIG. 9 which further includes voltage feedback.

FIG. 10 illustrates an embodiment of control circuitry 1060, which may be employed as an embodiment of control circuitry 160 of FIG. 1. Components in control circuitry 1060 may be similar to components in control circuitry 960 of FIG. 9, and may be different in some ways. Control circuitry 1060 may further include resistors R2 and R3, feedback voltage error amplifier Av, and driver DRV2. Control circuit 1069 further includes CC-CV linear regulation control circuit 1062.

Resistors R2 and R3 are arranged to operate as a voltage divider to provide feedback voltage Vfb from battery voltage Vbat. Also, error amplifier Av is arranged to provide voltage error signal Err_V from feedback voltage Vfb and reference voltage Vref2.

CC-CV switching regulation control circuit 1063 is arranged to provide switching regulation signal SRCTL based on a CC-CV switching algorithm. In one embodiment, CC-CV switching regulation circuit 1063 is arranged to provide signal SRCTL such that a parameter of signal SRCTL is modulated based on signal Err_V, and such that signal Err_C is employed as a current limit.

Additionally, CC-CV linear regulation control circuit 1062 is arranged to provide linear regulation control signal LRCTL based on a CC-CV linear regulation algorithm. In one embodiment, CC-CV linear regulation control circuit 1062 is arranged to provide linear regulation control signal LRCTL by performing a majority function between signals Err_C and Err_V. Accordingly, in this embodiment, signal LRCTL substantially corresponds to the greater of signal Err_C and signal Err_V.

Figure 11:
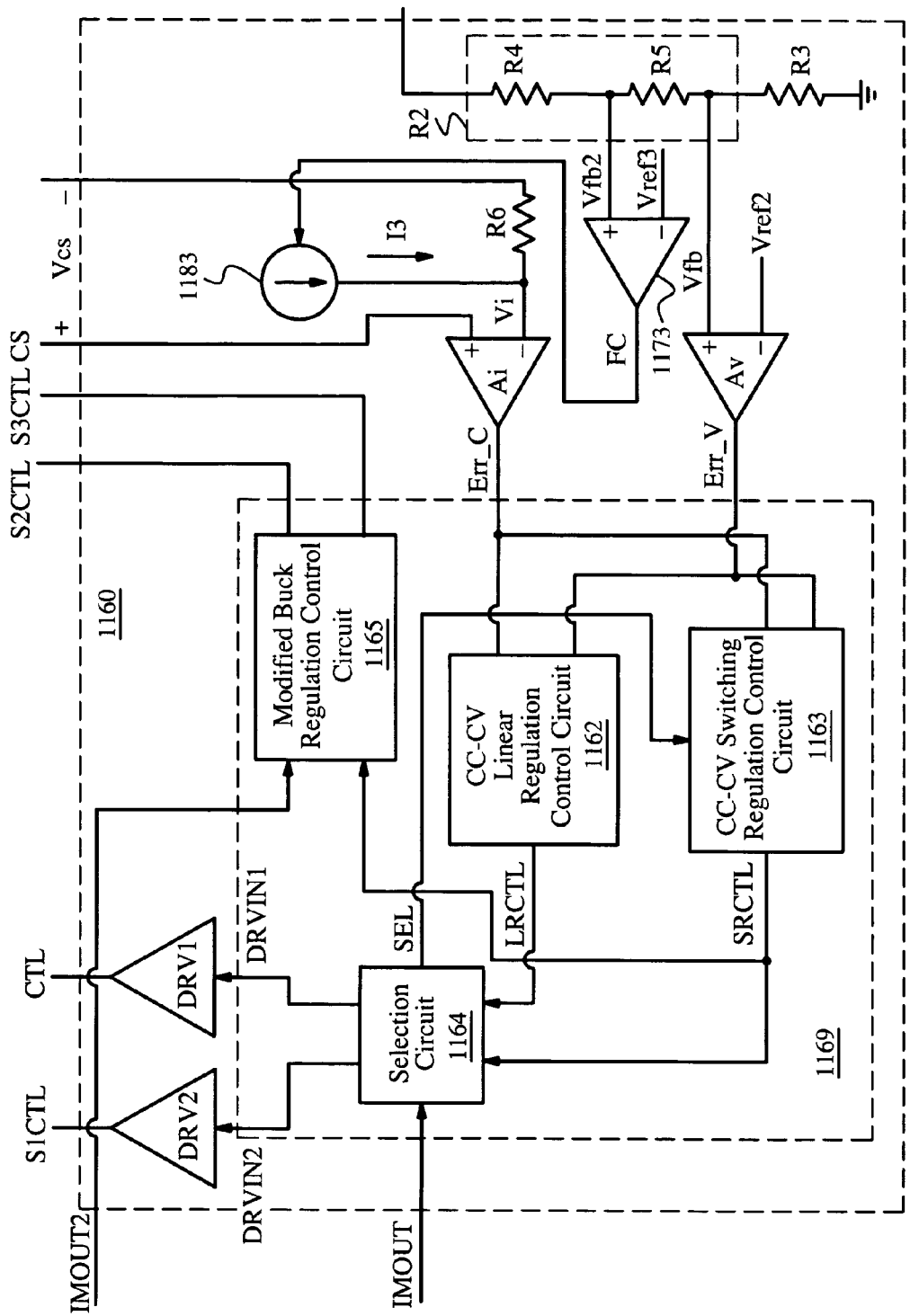
FIG. 11 illustrates a block diagram of an embodiment of the control circuitry of FIG. 9 which further includes a modified buck regulation control circuit.

FIG. 11 illustrates a block diagram of an embodiment of control circuitry 1160, which may be employed as an embodiment of control circuitry 1060 of FIG. 10. Control circuitry 1160 further includes comparator 1173, current source 1183, and resistor R6. Also, resistor R2 includes resistor R4 and resistor R5. Control circuitry 1169 further includes modified buck regulation control circuit 1165.

In operation, modified buck regulation control circuit 1165 provides signal S2CTL and S3CTL based on signal IMOUT2 and SRCTL.

Also, resistors R3-R5 are arranged to provide voltage Vfb2 from voltage Vbat. Comparator 1173 is arranged to provide full-charge signal FC based on a comparison of voltage Vfb2 with reference voltage Vref3. In one embodiment, comparator 1173 is configured to trip when voltage Vbat reaches a minimum safe operating voltage. For example, in Li—Ion batteries, the safe operating region is considered to be from about 3.0V to 4.2V. In one embodiment, comparator 1173 trips, asserting full-charge signal FC, at about 3.0V.

Additionally, resistor R6 is arranged to provide a voltage drop of approximately I3*R6. Current source 1183 is arranged to provide current I3 such that current I3 is adjustable based on signal FC. In one embodiment, current source 1183 is arranged for regulating current Icharge to 1C in constant current (CC) mode if signal FC is asserted during constant current mode. Further, current source 1183 may be arranged for regulating current Icharge to 0.1 C if signal FC is unasserted.

In one embodiment, CC-CV regulation for a Lithium-Ion battery occurs as follows. If battery voltage Vbat is below the minimum safe operating voltage (e.g. 3.0V), current Icharge is regulated to a constant current corresponding to 0.1 C, which is referred to as "pre-charge mode". C represents battery capacity, typically measured in milliAmpere-hours (mA*hr). So, for a battery with a capacity of 500 mA*hr, if Vbat is below the minimum safe operating voltage (e.g. 3.0V), then charge current Icharge is regulated to 50 mA. Once Vbat reaches the minimum safe operating voltage, signal FC is asserted, and current Icharge is regulated at a constant current corresponding to 1 C (e.g. 500 mA, for a 500 mA*hr battery). The battery charger (e.g. battery charger 500 of FIG. 5) remains in constant current (CC) mode, regulating Icharge to a constant current, until battery voltage Vbat reaches the maximum safe operating voltage (e.g. 4.2V).

At this point, the battery charger operates in constant voltage (CV) mode, regulating voltage Vbat to a constant voltage. This continues until charge current Icharge drops below an end-of-charge value, at which point the charge cycle is ended. When the charging cycle ends, charge current Icharge is not applied to the battery (e.g. battery 530 of FIG. 5) until the next charge cycle. The battery charger may monitor the battery charger, and begin another charging cycle if the battery voltage drops below a predetermined voltage (e.g. 4.0V) and the battery charger is connected to a power source (e.g. power source 540 of FIG. 5). Although not shown in FIG. 11, control circuitry 1160 may further include a watchdog comparator that is configured to determine whether a source voltage is applied at input node N1. After a charge cycle ends, the battery charge is in idle mode, and only the watchdog comparator is active to sense the voltage at node N1.

During the battery charging, at any given time, the CC-CV regulation is accomplished by either CC-CV linear regulation or CC-CV switching regulation, depending on whether signal SEL is asserted. Signal SEL may change logic levels one or more times during a charging cycle, in which case, the battery charger changes between CC-CV linear regulation and CC-CV switching regulation accordingly.

In one embodiment, if the power source (e.g. power source 540 of FIG. 5) is a regulated power source, the battery charger may operate as follows. During the pre-charge mode, linear regulation is employed. During the CC mode at about 3.0V, the linear regulation is employed initially. However, VIN-Vbat may reach threshold thresh1 relatively quickly at this point, causing signal SEL to be asserted. Accordingly, in this example, switching regulation is employed for most of the CC operation. During the CV mode, VIN-Bat falls below the threshold, causing signal SEL to be unasserted. Accordingly, linear regulation is employed for most of the CV operation.

Further, in this embodiment, if the power source is an unregulated power source, the battery charger may operate as follows. During the pre-charge mode and the constant current mode, linear regulation is employed (i.e. signal SEL is unasserted). At the beginning of CV mode, signal SEL is still unasserted. However, at some point during the CV mode, VIN-Vbat reaches thresh1, causing signal SEL to be asserted. At this point, the battery charger employs switching regulation.

Figure 12:
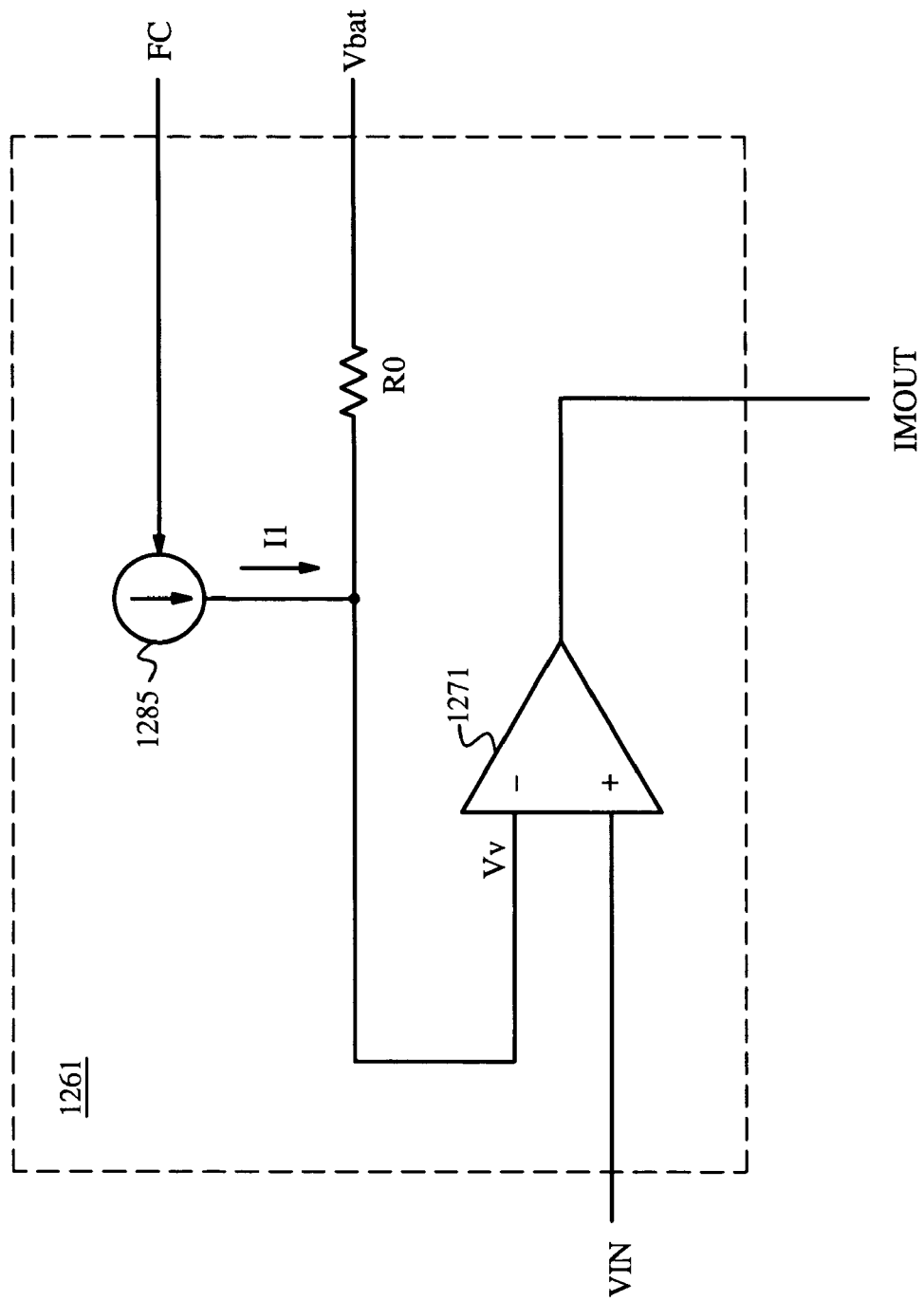
FIG. 12 shows a block diagram of an embodiment of the input monitor circuit of FIG. 6 in which the current source is adjustable based on the full-charge signal of FIG. 11.

FIG. 12 shows a block diagram of an embodiment of input monitor circuit 1261. Input monitor circuit 1261 is an embodiment of input monitor circuit 661 of FIG. 6. In one embodiment, as illustrated in FIG. 12, current source 1285 is arranged to receive full-charge signal FC, and is further arranged to provide current I1 such that current I1 is adjustable based on signal FC. In another embodiment, current source 1285 does not receive signal FC, but comparator 1271 is arranged to compare voltage VIN with voltage (Vv-Vi) rather than Vv. In either case, input monitor circuit 1261 is arranged to vary threshold thresh1 based on a monitored charge current (Icharge).

Figure 13:
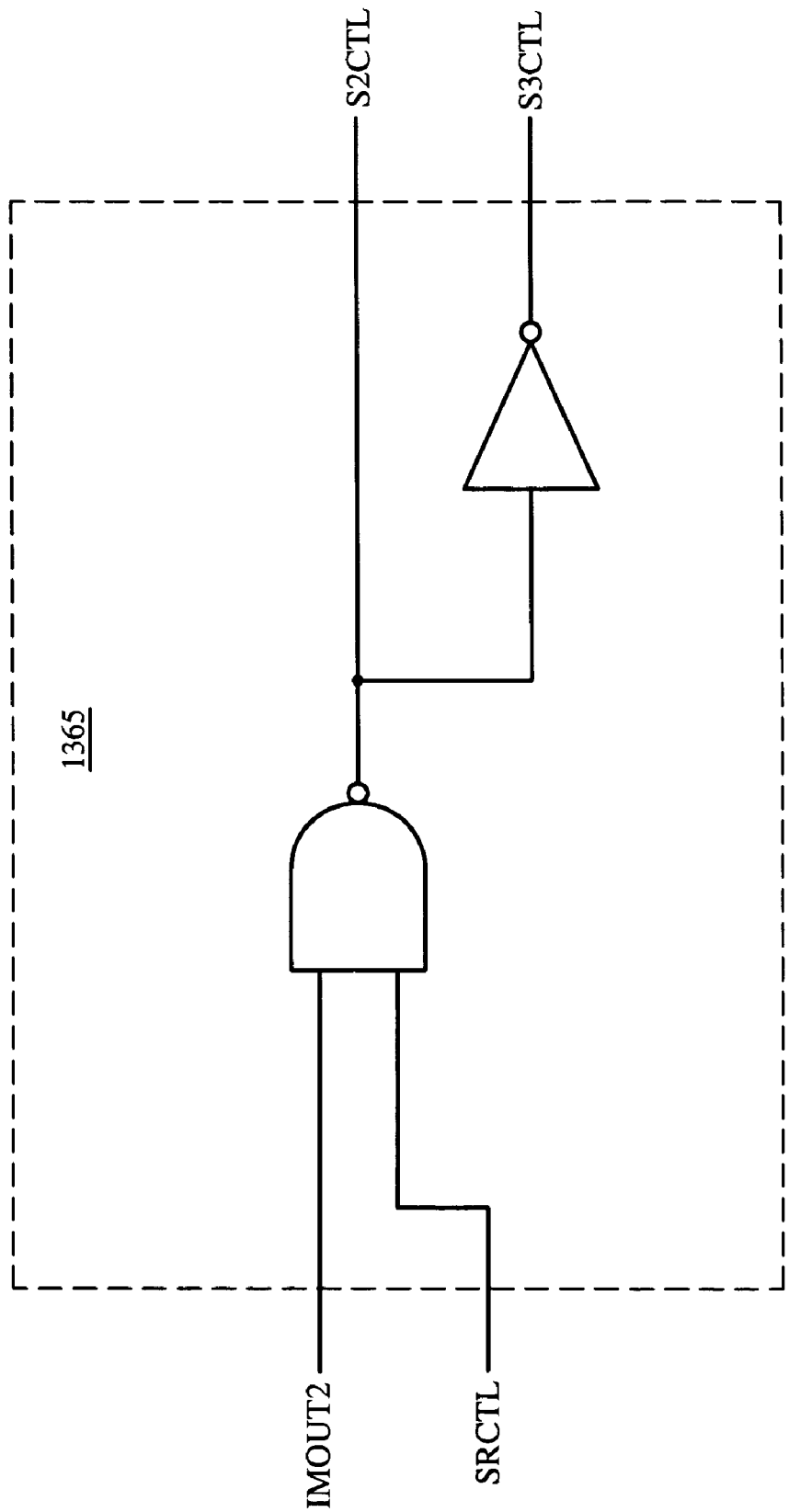
FIG. 13 illustrates a block diagram of an embodiment of the modified buck regulation control circuit of FIG. 11.

FIG. 13 illustrates a block diagram of an embodiment of modified buck regulation control circuit 1365. In this embodiment, if signal SRCTL is asserted and signal IMOUT2 is asserted, then signal S3CTL is asserted to close switch circuit S3 (e.g. of FIG. 4) and signal S2CTL is unasserted to open switch circuit S2 (e.g. of FIG. 4). However, if either signal SRCTL or signal IMOUT2 is unasserted, then signal S2CTL is asserted and signal S3CTL is unasserted.

Figure 14:
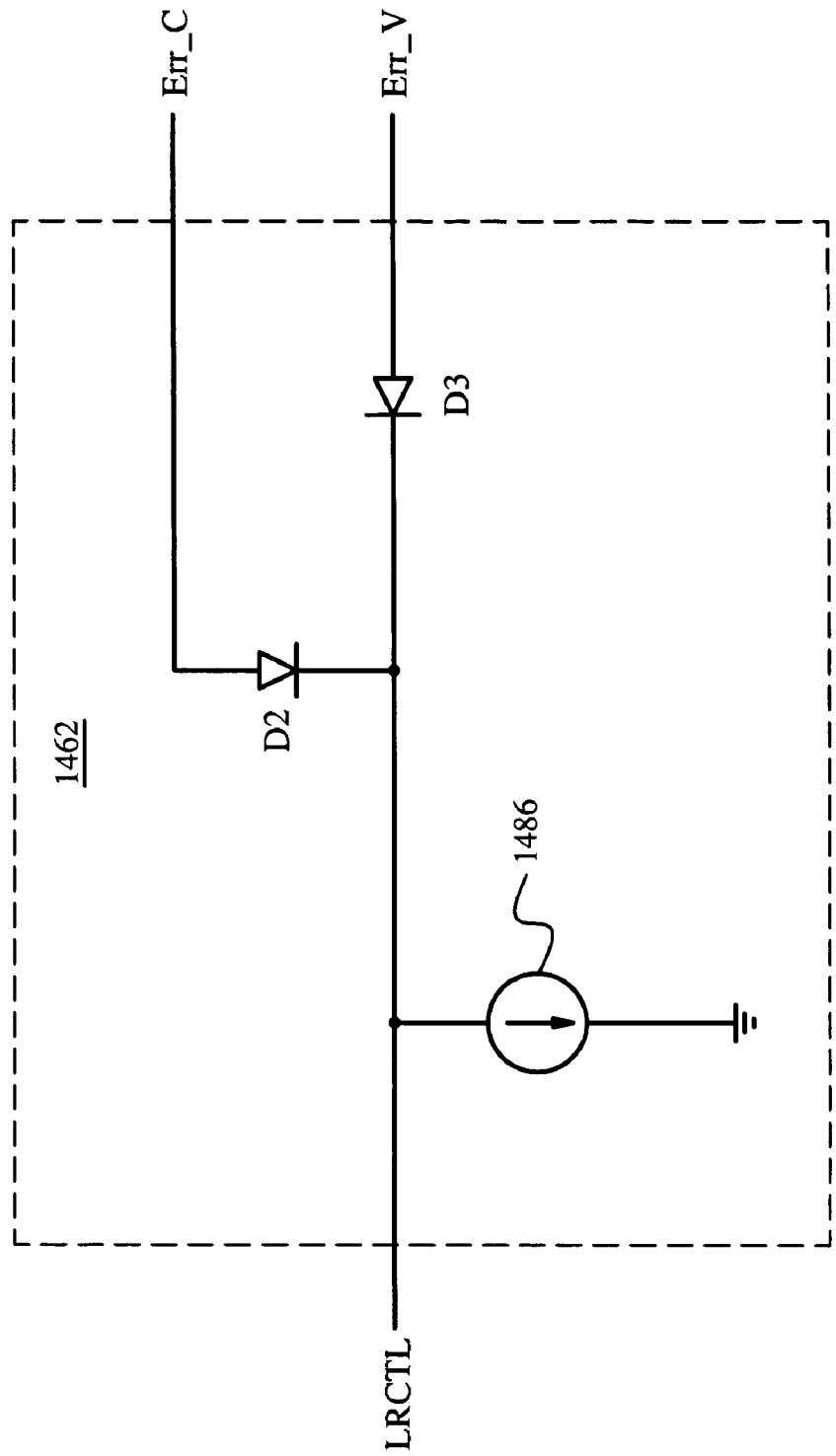
FIG. 14 shows a block diagram of an embodiment of the CC-CV linear regulation control circuit of FIG. 10 or 11.

FIG. 14 shows a block diagram of an embodiment of CC-CV linear regulation control circuit 1462, which may be employed as an embodiment of circuit 1062 of FIG. 10 or circuit 1162 of FIG. 11. An embodiment of CC-CV linear regulation circuit 1462 includes diode D2, diode D3, and bias current sink 1486. FIG. 14 illustrates one embodiment of a majority function circuit. However, the invention is not so limited. Other embodiments of implementing a majority function for providing signal LRCTL are within the scope and spirit of the invention.

Figure 15:
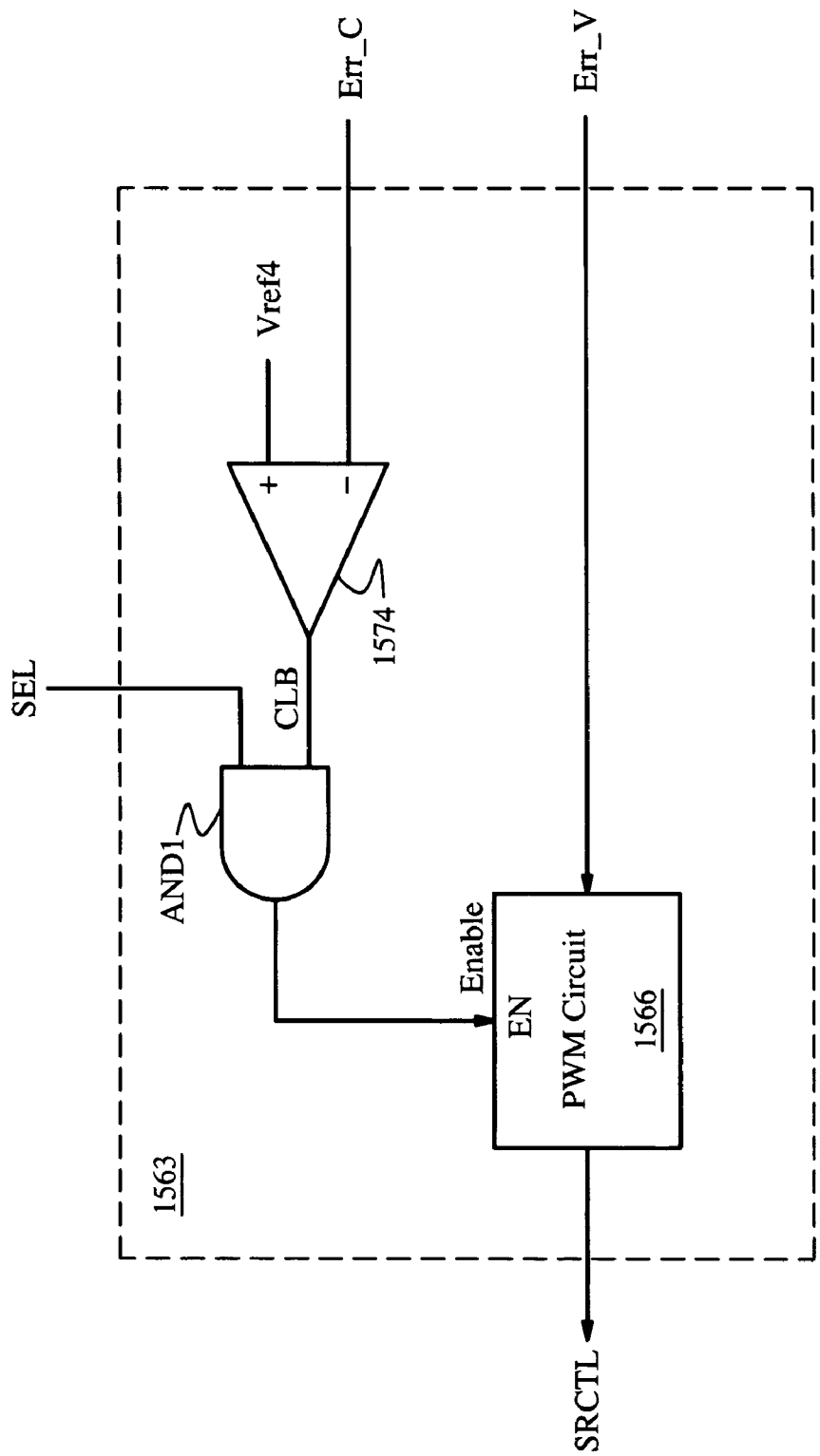
FIG. 15 illustrates a block diagram of an embodiment of the CC-CV switching regulation control circuit of FIG. 10 or 11.

FIG. 15 illustrates a block diagram of an embodiment of CC-CV switching regulation control circuit 1563, which may be employed as an embodiment of circuit 1063 of FIG. 10 or circuit 1163 of FIG. 11. CC-CV switching regulation circuit 1563 includes PWM circuit 1566, AND gate AND1, and current limit comparator 1574.

In operation, current limit comparator 1574 provides current limit signal CLB based on reference signal Vref4 and current error signal Err_C. In the embodiment shown, signal CLB corresponds to a logic low if signal Err_C is greater than reference signal Vref4; however, in other embodiments, the logic may be reversed. Also, AND gate AND1 is arranged to provide signal Enable from signal SEL and signal CLB. Accordingly, signal Enable is asserted if signal SEL is asserted and the current limit has not been reached, and signal Enable is unasserted otherwise.

Further, PWM circuit 1566 is arranged to provide signal SCTL from signal Err_V such that the pulse width of signal SRCTL is modulated based on signal Err_V. PWM circuit 1566 is arranged to be disabled if signal Enable is unasserted.

Although a PWM circuit is shown in FIG. 15, in other embodiment, a PFM circuit may be employed in addition to, or in place of, a PWM circuit.

Figure 16:
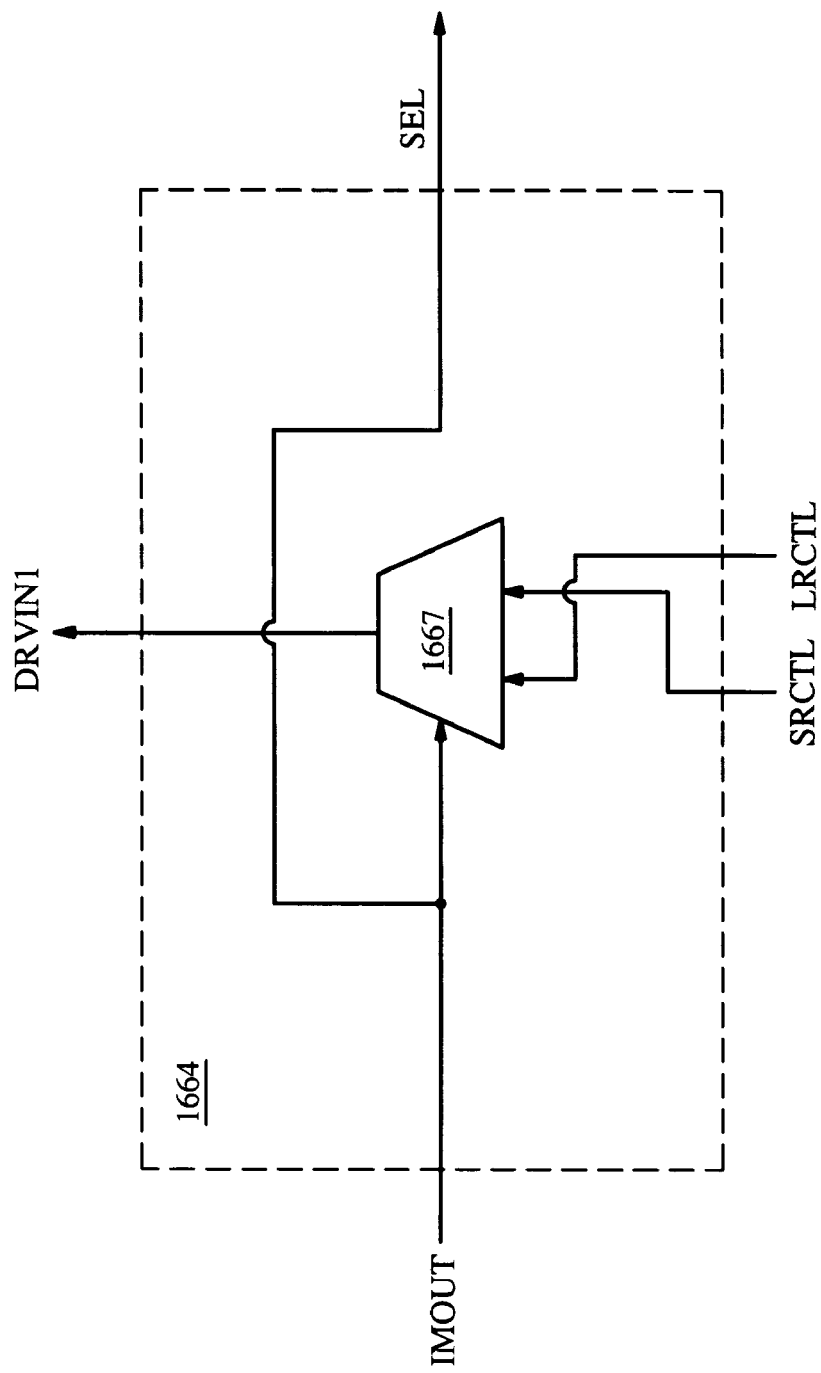
FIG. 16 shows a block diagram of an embodiment of the selection circuit of FIGS. 9-11.

FIG. 16 shows a block diagram of an embodiment of selection circuit 1664, which may be employed as an embodiment of selection circuit 964, 1064, or 1164 or FIGS. 9-11, respectively. Selection circuit 1664 includes multiplexer 1667.

Multiplexer 1667 is arranged to provide control signal DRVIN1 by selecting between switching regulation control signal SRCTL and linear regulation control signal LRCTL. More specifically, in one embodiment, multiplexer 1667 is arranged to select signal SRCTL if signal SEL is asserted, and to select signal LRCTL if signal SEL is unasserted. In the embodiment shown, signal IMOUT is employed as signal SEL. In another embodiment, signal SEL is a different signal from signal IMOUT that is based, in part, on signal IMOUT.

Figure 17:
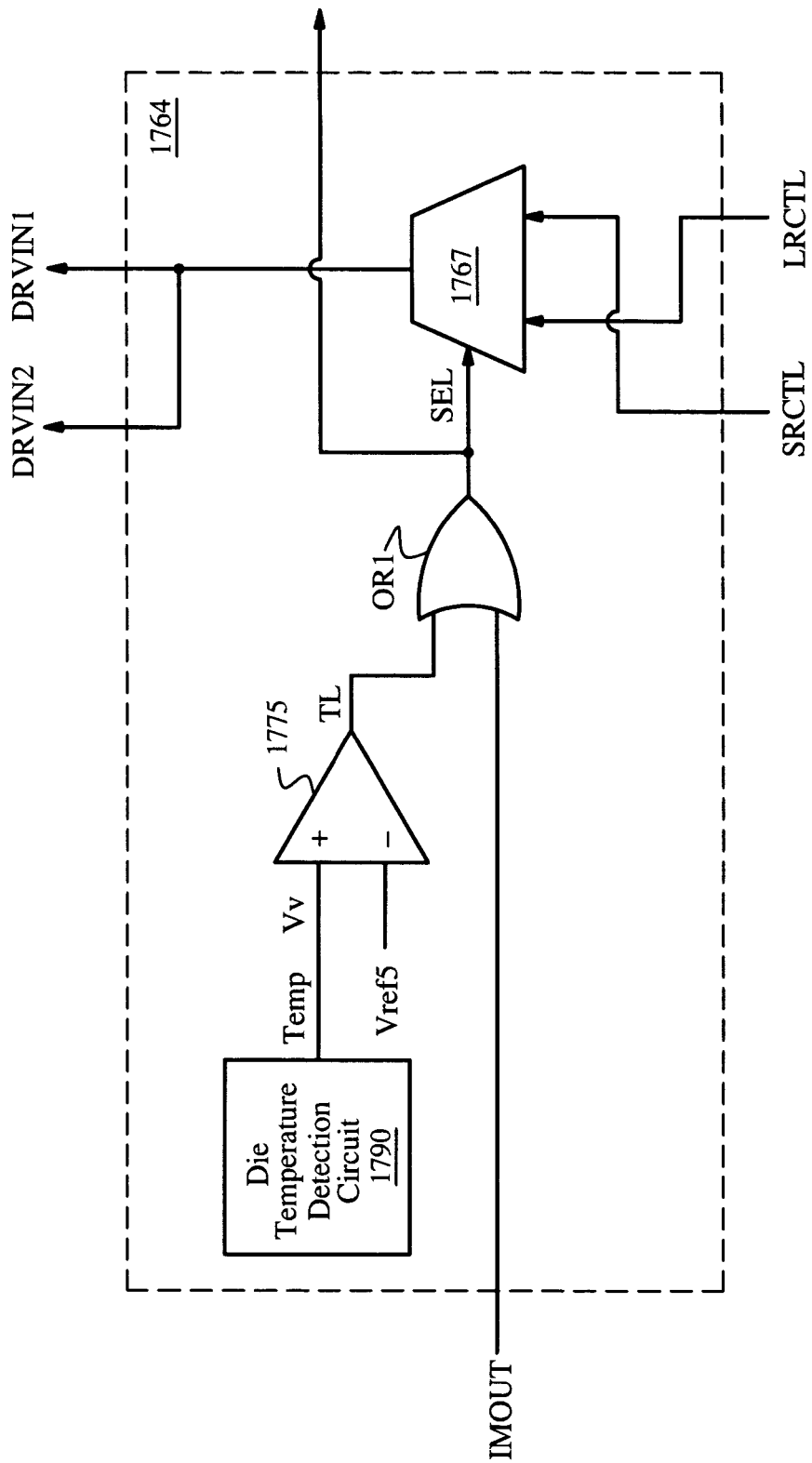
FIG. 17 illustrates a block diagram of an embodiment of the selection circuit of FIGS. 9-11 that includes a die temperature selection circuit, arranged in accordance with aspects of the present invention.

FIG. 17 illustrates a block diagram of an embodiment of the selection circuit 1764. Selection circuit 1764 may be employed as an embodiment of selection circuit 1664 of FIG. 16. Selection circuit 1764 further includes OR gate OR1 and die temperature selection circuit 1790. Components in selection circuit 1764 may operate in a similar manner as similarly-named components in previously discussed figures, and may operate in a different manner in some ways.

In operation, comparator 1775 provides temperature limit signal TL based on a comparison of signal Temp and reference voltage Vref5. Further, OR gate OR1 is arranged to provide signal SEL such that signal SEL is asserted if signal TL is asserted or if signal IMOUT is asserted.

The above specification, examples and data provides a description of the manufacture and use of the composition of the invention. Since many embodiments of the invention can be made without departing from the spirit and scope of the invention, the invention also resides in the claims hereinafter appended.

What is claimed is:

1. A method for charging a battery, comprising:
   employing linear regulation to provide a charge current to the battery;
   monitoring at least one operating condition of the charging;
   based on the at least one monitored operating condition, determining whether a first pre-determined condition is satisfied;
   if the first pre-determined condition is satisfied, employing switching regulation to provide the charge current;
   providing a voltage error signal that is based, in part, on a voltage of the battery; and
   providing a current error signal that is based, in part, on the charge current, wherein:
      employing linear regulation includes:
         providing a linear regulation control signal by performing a majority function on the voltage error signal and the current error signal; and
         driving the gate of the power transistor based on the linear regulation control signal; and
      wherein employing switching regulation includes:
         providing a switching regulation control signal based on pulse modulating a clock signal with the voltage error signal, and further based on employing the current error signal as a current limit; and
         driving the gate of the power transistor based on the switching regulation control signal.

2. The method of claim 1, wherein:
   the at least one monitored operating condition includes an input voltage;
   the first pre-determined condition is satisfied if the input voltage minus the battery voltages exceeds a first threshold;
   the switching regulation is performed as buck pulse charge switching regulation if the input voltage minus the battery voltage exceeds a second threshold, wherein the second threshold is greater than the first threshold;
   an inductor is coupled between the power transistor and a node;
   the switching regulation is performed as modified buck pulse charge switching regulation if the input voltage minus the battery voltage is greater than the first threshold and less than the second threshold; and
   wherein performing the switching regulation as modified buck pulse charge switching regulation includes:
      when the power transistor is closed, coupling the node to ground; and
      when the power transistor is open, coupling the node to the battery voltage.

3. The method of claim 1, wherein the at least one monitored operating condition includes at least one of the input voltage, a die temperature, or the charge current.

4. A circuit for charging a battery, comprising:
   an input monitor circuit that is arranged to compare an input voltage to a battery voltage; and to provide an input monitor output signal based on the comparison;
   a control circuit that is arranged to provide a control signal to a power transistor to enable the power transistor to regulate a charge current based on the input voltage and the control signal, using the input voltage as the power source for the regulation, wherein
      the control circuit is configured to provide the control signal such that: the control signal is based, in part, on the charge current; the power transistor performs linear regulation if a pre-determined condition is not satisfied; and such that the power transistor performs switching regulation if the pre-determined condition is satisfied;
      wherein the pre-determined condition is based, at least in part, on the input monitor output signal; and
      wherein the input monitor circuit is arranged to assert the input monitor output signal if the input voltage exceeds the battery voltage by a first threshold;
   a current sense error amplifier that is arranged to provide a current error signal that is based, in part, on the charge current;
   a voltage divider that is arranged to provide a feedback voltage from the battery voltage;
   a feedback voltage error amplifier having at least a first input that is arranged to receive the feedback voltage, a second input that is arranged to receive a reference voltage, and an output that is configured to provide a voltage error signal based on a difference between the feedback voltage and the reference voltage,
   wherein the control circuit further includes:
      a CC-CV linear regulation control circuit that includes a majority function circuit having at least a first input that is arranged to receive the current error signal, a second input that is arranged to receive the voltage error signal, and an output that is configured to provide a linear regulation control signal that substantially corresponds the greater of the current error signal and the voltage error signal;
      a CC-CV switching regulation control circuit that is arranged to provide a switching regulation control based, in part, on the current error signal and the voltage error signal, wherein the CC-CV switching regulation control circuit includes a pulse modulation circuit and a current limit comparator; and a multiplexer circuit that is arranged to receive the linear regulation control signal, the switching regulation control circuit, and a multiplexer select signal, and further arranged to provide the first control signal by multiplexing the linear regulation control signal and the switching regulation control signal based on the multiplexer select signal, wherein the multiplexer select signal is based, at least in part, on the input monitor output signal.

5. The circuit of claim 4, wherein the input monitor circuit is configured such that the first threshold is a fixed value in a range from about 100 mV to 200 mV.

6. The circuit of claim 4, wherein the input monitor circuit is configured such that the first threshold varies based on a die temperature.

7. The circuit of claim 4, wherein the current sense error amplifier has at least: a first input that is arrange to receive the current sense signal, a second input, and an output that is configured to provide the current error signal; the circuit further comprising:

a comparator that is arranged to assert a full charge signal if the battery voltage is greater than a pre-determined minimum safe operating voltage;

a resistor that is coupled to the second input of the current sense error amplifier circuit, wherein the first threshold varies based, in part, on a voltage drop across the resistor; and a current source that is arranged to provide a current to the resistor at a first level if the full charge signal is asserted, and further arranged to provide the current to the resistor at a second level if the full charge is unasserted, wherein the second level is approximately one-tenth of the first level.

8. The circuit of claim 4, wherein the pre-determined condition is satisfied if the input monitor output signal is asserted.

9. The circuit of claim 8, further comprising a die temperature detection circuit, wherein the pre-determined condition is also satisfied if a die temperature exceeds a pre-determined temperature.

10. The circuit of claim 4, wherein the multiplexer select signal is the input monitor output signal.

11. The circuit of claim 4, further comprising:

a die temperature detection circuit that is arranged to provide a temperature signal that is substantially proportional to the die temperature;

a comparator that is arranged to provide a temperature limit signal based on the temperature signal; and an OR gate having at least an output that is configured to provide the multiplexer select signal, a first input that is arranged to receive the input monitor signal at the first input, and a second input that is arranged to receive the temperature limit signal at the second input.

12. The circuit of claim 4, wherein the input voltage is provided from at least one of a wall adapter, a car adapter, or a power bus.

13. A circuit for charging a battery, comprising:

an input monitor circuit that is arranged to compare an input voltage to a battery voltage; and to provide an input monitor output signal based on the comparison;

a control circuit that is arranged to provide a control signal to a power transistor to enable the power transistor to regulate a charge current based on an input voltage and the control signal, wherein the control circuit is configured to provide the control signal such that: the control signal is based, in part, on the charge current; the power transistor performs linear regulation if a pre-determined condition is not satisfied; and such that the power transistor performs switching regulation if the pre-determined condition is satisfied;

the pre-determined condition is based, at least in part, on the input monitor output signal; and wherein the input monitor circuit is arranged to assert the input monitor output signal if the input voltage exceed the battery voltage by a first threshold;

a first switch circuit that is coupled between a first node and an output node, wherein the first switch circuit is arranged to close if a second control signal is asserted, and to open if the second control signal is unasserted;

a second switch circuit that is coupled between the first node and ground, wherein the second switch circuit is arranged to close if a third control signal is asserted, and to open if the third control signal is unasserted;

the circuit for charging the battery is arranged to operate with an inductor coupled between a second node and the first node, with the power transistor coupled between an input node and the second node, and with the power transistor receiving the input voltage at the input node; and wherein the control circuit is further arranged to provide the second and third control signals such that:

if the input voltage minus the battery voltage is less than the first threshold, the power transistor performs linear regulation;

if the input voltage minus the battery voltage is greater than the first threshed and a second threshold, the power transistor performs buck pulse switching regulation;

if the input voltage minus the battery voltage is greater than the first threshold, and less than the second threshold, the power transistor performs modified buck pulse switching regulation, wherein during the buck pulse seihng regulation and the modified buck pulse switching regulation, the control signal is provided such that the power transistor is closed during a first phase of a clock cycle, and such that the power transistor is open during a second phase of the clock cycle;

during the linear regulation and the buck pulse switching regulation, the second control signal is asserted and the third control signal is unasserted; and such that during the modified buck pulse switching regulation:

the second control signal is asserted during the first phase of the clock cycle and unasserted during the second phase of the clock cycle; and the third control signal is unasserted during the first phase of the clock cycle and asserted during the second phase of the clock cycle.

14. The circuit of claim 13, wherein the first threshold is a value from about 100 mV to 200 mV, and wherein the second threshold is about 1V.

15. The circuit of claim 13, wherein the first threshold is the value from about 100 mV to 200 mV at about room temperature, the first threshold is substantially proportional to a die temperature, and wherein the second threshold is about 1V.

16. The circuit of claim 13, further comprising:

a current sense error amplifier that is arranged to provide a current error signal that is based, in part, on the charge current;

a voltage divider that is arranged to provide a feedback voltage from the battery voltage;

a feedback voltage error amplifier having at least a first input that is arranged to receive the feedback voltage, a second input that is arranged to receive a reference voltage, and an output that is configured to provide a voltage error signal based on a difference between the feedback voltage and the reference voltage, wherein the control circuit further includes:
- a CC-CV linear regulation control circuit that includes a majority function circuit having at least a first input that is arranged to receive the current error signal, a second input that is arranged to receive the voltage error signal, and an output that is configured to provide a linear regulation control signal that substantially corresponds the greater of the current error signal and the voltage error signal;
- a CC-CV switching regulation control circuit that is arranged to provide a switching regulation control based, in part, on the current error signal and the voltage error signal, wherein the CC-CV switching regulation control circuit includes a pulse modulation circuit and a current limit comparator; and
- a multiplexer circuit that is arranged to receive the linear regulation control signal, the switching regulation control circuit, and a multiplexer select signal, and further arranged to provide the first control signal by multiplexing the linear regulation control signal and the switching regulation control signal based on the multiplexer select signal, wherein the multiplexer select signal is based, at least in part, on the input monitor output signal.

17. The circuit of claim 13,
wherein the control circuit includes:
- a linear regulation control circuit that is operable to provide a linear regulation control signal;
- a switching regulation control circuit that is operable to provide a switching regulation control, wherein the switching regulation control circuit includes a pulse modulation circuit; and
- a multiplexer circuit that is arranged to receive the linear regulation control signal, the switching regulation control circuit, and a multiplexer select signal, and further arranged to provide the first control signal by multiplexing the linear regulation control signal and the switching regulation control signal based on the multiplexer select signal.

18. The circuit of claim 13, wherein the control circuit includes a pulse modulation circuit, the pulse modulation circuit is operable to perform pulse modulation, and wherein the switching regulation is based, at least in part, on the pulse modulation.

19. The circuit of claim 18, wherein the pulse modulation circuit is a pulse width modulation circuit.

20. The circuit of claim 18, wherein the pulse modulation circuit is a pulse frequency modulation circuit.

21. A circuit for charging a battery, comprising:
a current sense error amplifier that is arranged to provide a current error signal that is based, in part, on a charge current; and
a control circuit that is arranged to provide a control signal to a power transistor to enable the power transistor to regulate the charge current based on an input voltage and the control signal, using the input voltage as the power source for the regulation, wherein
the control circuit is configured to provide the control signal such that: the control signal is based, in part, on the current error signal; the power transistor performs linear regulation if a pre-determined condition is not satisfied; and such that the power transistor performs switching regulation if the pre-determined condition is satisfied; and
wherein the pre-determined condition is based, at least in part, on at least one of the input voltage, a die temperature, or the charge current.

22. A circuit for charging a battery, comprising:
an input monitor circuit that is arranged to compare an input voltage to a battery voltage; and to provide an input monitor output signal based on the comparison; and
a control circuit that is arranged to provide a control signal to a power transistor to enable the power transistor to regulate a charge current based on the input voltage and the control signal, using the input voltage as the power source for the regulation, wherein
the control circuit is configured to provide the control signal such that: the control signal is based, in part, on the charge current; the power transistor performs linear regulation if a pre-determined condition is not satisfied; and such that the power transistor performs switching regulation if the pre-determined condition is satisfied; and
wherein the pre-determined condition is based, at least in part, on the input monitor output signal.

23. The circuit of claim 22, wherein the input voltage is provided from at least one of a wall adapter, a car adapter, or a power bus.

24. A method for charging a battery, comprising:
employing linear regulation to provide a charge current to the battery, using an input voltage as the power source for the regulation;
monitoring at least one operating condition of the charging;
based on the at least one monitored operating condition, determining whether a first pre-determined condition is satisfied; and
if the first pre-determined condition is satisfied, employing switching regulation to provide the charge current, wherein the at least one monitored operating condition includes at least one of the input voltage, a die temperature, or the charge current.

25. The method of claim 24, wherein the at least one monitored operating condition includes the input voltage, and wherein the first pre-determined condition is satisfied if the input voltage minus the battery voltage exceeds a first threshold.

26. The method of claim 25, wherein the at least one monitoerd operating condition further includes a die temperature, wherein the first threshold is a value from approximately 100 mV to 200 mV if the die temperature corresponds to approximately room temperature, and wherein the first threshold is substantially proportional to the die temperature.

* * * * *